United States Patent [19]
Wivagg

[11] Patent Number: 5,727,431
[45] Date of Patent: Mar. 17, 1998

[54] BLIND NUT TOOL

[75] Inventor: Adrian P. Wivagg, Tolland, Conn.

[73] Assignee: Combustion Engineering, Inc., Windsor, Conn.

[21] Appl. No.: 705,925

[22] Filed: Aug. 29, 1996

[51] Int. Cl.⁶ ............................................... B25B 17/02
[52] U.S. Cl. ........................ 81/55; 81/13; 81/124.3; 81/180.1
[58] Field of Search .................. 81/13, 55, 121.1, 81/124.3, 180.1

[56] References Cited

U.S. PATENT DOCUMENTS

| | | | |
|---|---|---|---|
| 443,312 | 12/1890 | Bode | 81/13 |
| 1,382,320 | 6/1921 | Riley et al. | 81/55 |
| 2,367,689 | 1/1945 | Providence | 81/13 |

Primary Examiner—James G. Smith
Assistant Examiner—Lee Wilson
Attorney, Agent, or Firm—John H. Mulholland

[57] ABSTRACT

A blind nut tool has spaced arms, one to extend on either side of a drywell head flange. The arms are mounted on a U-shaped channel member and the lower arm holds and retains a nut and washer pair on the underside of the flange as it is torqued on a threaded stud extending through the flange. The channel receives the stud and has a pin which engages a flat on the stud for storage of the tool.

4 Claims, 2 Drawing Sheets

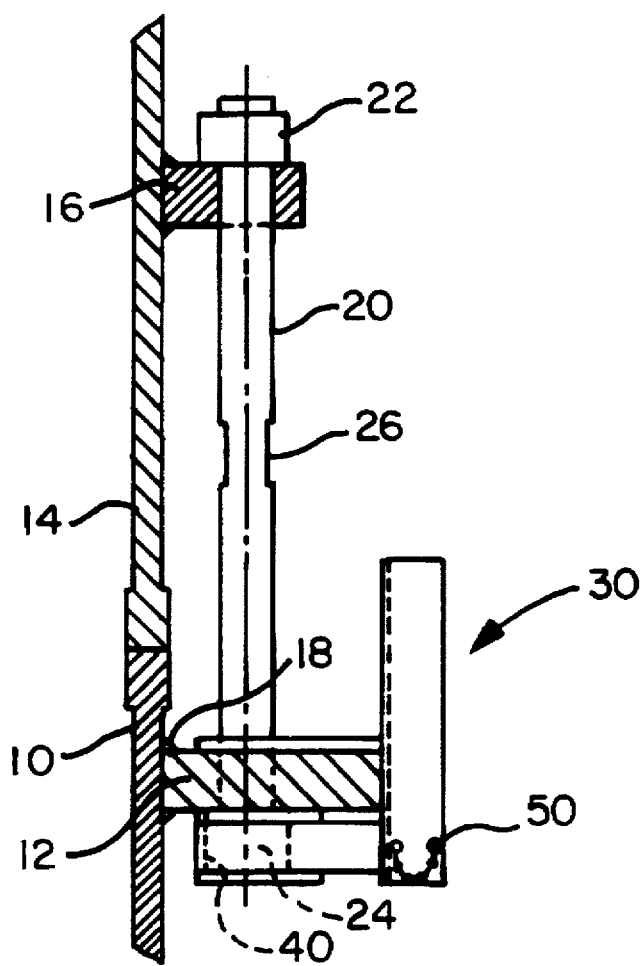
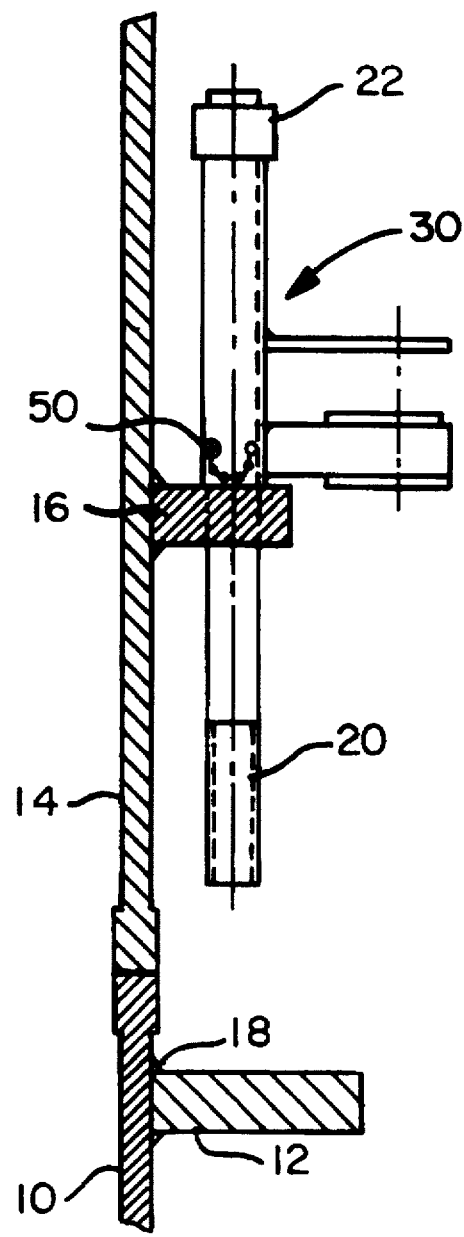
Fig. 1                  Fig. 2

BLIND NUT TOOL

BACKGROUND OF THE INVENTION

The present invention relates to a blind nut tool which can be used in many situations where is it not convenient to access a nut located on the opposite side of a flange or bulkhead from the torquing head of a bolt or stud extending therethrough or mounted thereon.

A particular use for the blind nut tool of the invention is in connection with the assembly and disassembly of a drywell head for a boiling water reactor (BWR). (For reference see U.S. Pat. Nos. 3,744,593 and 5,291,532). In such use, the tool has two basic functions. The first function is to hold the nut and washers on the bottom of the studs or bolts. The second is to support the studs and keep the parts together while the head is off the drywell.

The conventional drywell head of a BWR separates the bottom of an upper refueling pool located directly above the reactor core from the pressure vessel during operation. It is, however, completely removed during the refueling operation for providing access to the reactor core within the vessel. During refueling, water completely fills the open pressure vessel up to the top of the upper refueling pool. When the drywell head is removed or attached, the water level is just above the nut and threaded end of the stud which receives the nut. The parting line between the drywell head and the drywell is just above the water level at this time.

A drywell head for a BWR is typically 9.1 meters (30 feet) in diameter and has 84 studs which hold the head to the drywell in what is, essentially, a big flanged joint. Each stud is torqued to over 2.71 kilojoule (2000 ft-pounds).

SUMMARY OF THE INVENTION

The blind nut tool of the invention is designed to hold the nut on the bottom end of the drywell flange so that workers do not have to hold their hands in the water which is there for shielding from the radioactive core below. Nuts and washers have frequently been dropped into the water requiring dangerous "fishing trips" and the tool is designed to prevent this problem. The tool also holds a spherical washer pair in proper orientation to avoid the problem of them being assembled upside down, requiring a significant quality control (QC) effort in nuclear plants. The tool provides an easy way to maintain quality with significantly less chance for error.

A feature of the tool of the invention is that a column, preferably in the form of a U-shaped channel, is provided therein to prevent nut rotation for the torquing operation. This channel also acts as a support for the stud. In the prior practice, pipes and tie wraps have been used at some BWR plants to hold the studs when the drywell head is in storage during an outage. The convenient channel, which remains out of the water, also provides a place to grip the tool.

Another feature of the invention is that the tool always remains with the drywell head during storage, thus preventing its loss, because it is held firmly in place on the stud and the drywell head flange by a pin.

BRIEF DESCRIPTION OF THE DRAWINGS

FIG. 1 is a fragmentary side elevational view of the tool in place for torquing studs and nuts for assembly and or removal of a drywell head from a drywell;

FIG. 2 is a view similar to FIG. 1 of the tool in place for storage;

DETAILED DESCRIPTION OF THE PREFERRED EMBODIMENT

Figure 4:
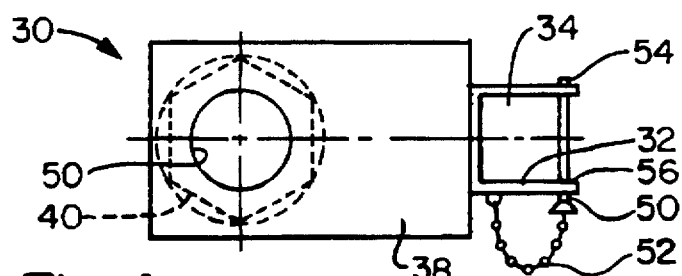
FIG. 4 is a plan view of the tool of FIG. 3.
Figure 3:
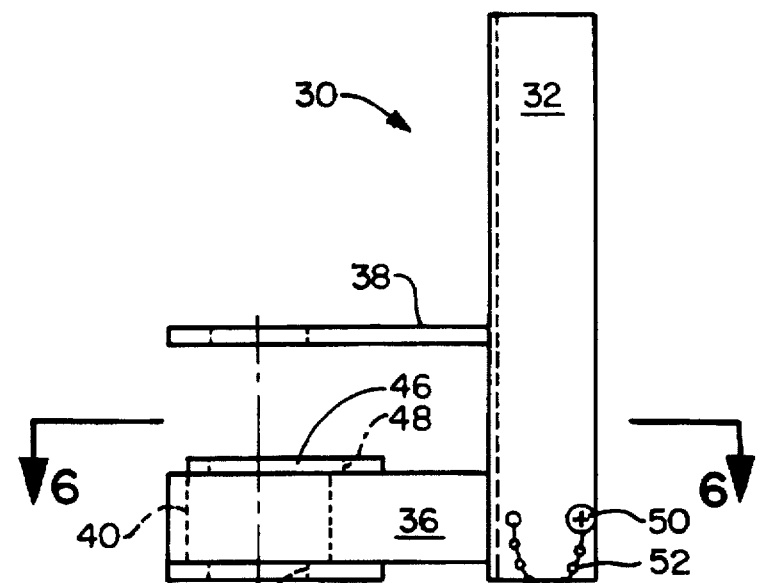
FIG. 3 is an enlarged side elevational view of the tool.
Figure 5:
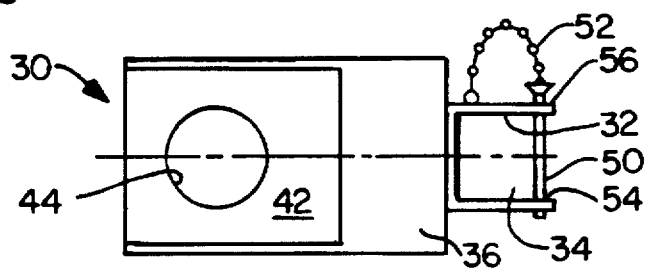
FIG. 5 is a bottom view of the tool of FIG. 3.
Figure 6:
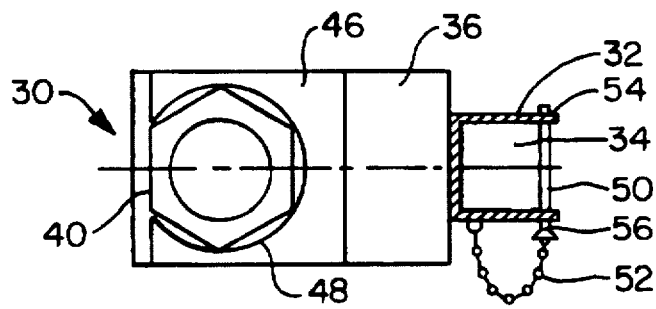
FIG. 6 is a view taken along line 6—6 of FIG. 3.

The numeral 10 generally designates a BWR drywell wall portion having a flange 12 welded, as shown at 18, or otherwise provided thereon. A drywell head 14 has a flange 16 welded or otherwise provided thereon for securing head 14 to the drywell by means of a threaded stud 20. The stud 20 has a nut 22 at its upper end, above flange 16, and a bottom nut 24 at its lower end, below flange 12, to provide a tensioned joint holding the head 14 in position on the drywell wall 10. A wrench pad or flat 26 is provided on the shank of the stud 20 for applying torque thereto.

The blind nut tool is generally designated by the numeral 30. The tool 30 includes a column 32 which has a U-shaped channel 34 open on its side opposite first, lower, and second, upper, arms, 36 and 38 respectively, extending transversely from column 32 and spaced from each other by an amount sufficient to accommodate flange 12 of the drywell.

The first arm 36 is the lower arm and includes a polygonally, preferably hexagonal, shaped nut receiving hole 40. Below the nut receiving hole 40 and attached to the under side of the first arm 36 on the side thereof opposite said second arm 38 is a retainer 42 in the form of a plate welded or otherwise thereto. The retainer 42 has a stud receiving opening 44 through which the stud 20 may be received.

On the side of the first arm adjacent said second arm is welded or otherwise mounted a spacer plate 46 having a substantially cylindrical opening 48 therethrough for receipt of a preoriented dish-shaped washer having a concave upper face and a convex lower face. The opening 48 retains the washer in this orientation so that no mistakes can be made in the assembly operation. This eliminates a QC problem of the assembly.

The second or upper arm 38 has a cylindrical stud receiving hole 50 in register with hole 48 of the spacer plate 46, hexagonal hole 40 of the first or lower arm 36, and stud receiving hole 44 of the retainer plate 42 such that all of the openings have a common centerline.

A detent pin 50 is attached by means of a chain 52 to the channel member 32, and is provided with holes 54 and 56 therein, for receipt thereof adjacent wrench flat 26. When the tool 30 is stored as seen in FIG. 2, this pin retains the tool with stud 20 in the channel 34 for storage. The channel 34 also enhances the operator's grip when the tool 30 is used for retaining a nut for torquing as seen in FIG. 1.

I claim:

1. A tool for torquing a polygonally shaped nut relative to a threaded stud, said tool comprising:

a column member having first and second arms, each with opposing sides, extending transversely therefrom and spaced from each other;

a nut receiving hole of polygonal shape in said first arm similar to that of said nut;

a retainer on said tool adjacent said nut receiving hole on the side of said first arm opposite said second arm;

a spacer plate on said tool on the side of said first arm adjacent said second arm;

said second arm having a stud receiving opening;

said spacer plate having a cylindrical washer receiving cavity;

said retainer and said second arm each having a stud receiving opening.

2. The tool of claim 1 in which the column is a U-shaped channel containing member which is wider internally than the diameter of said stud.

3. The tool of claim 2 in which the channel containing member is open on the side opposite the first and second arms.

4. The tool of claim 1 in which all of said openings having a common centerline.

\* \* \* \* \*